United States Patent
Pedro et al.

(10) Patent No.: US 9,644,559 B2
(45) Date of Patent: May 9, 2017

(54) SYSTEMS AND METHODS FOR IMPROVING ENGINE EMISSIONS DURING STARTING

(71) Applicant: Ford Global Technologies, LLC, Dearborn, MI (US)

(72) Inventors: David Pedro, Windsor (CA); Allen Lehmen, Howell, MI (US); Marcus William Fried, Farmington Hills, MI (US); Paul Mahlon Ranspach, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/806,085

(22) Filed: Jul. 22, 2015

(65) Prior Publication Data

US 2017/0022918 A1    Jan. 26, 2017

(51) Int. Cl.
| | | |
|---|---|---|
| *B60T 7/12* | (2006.01) | |
| *F02D 41/06* | (2006.01) | |
| *F02D 41/14* | (2006.01) | |
| *F02D 41/26* | (2006.01) | |

(52) U.S. Cl.
CPC ....... *F02D 41/062* (2013.01); *F02D 41/1497* (2013.01); *F02D 41/26* (2013.01)

(58) Field of Classification Search
CPC .. F02P 5/04; F02P 5/045; F02P 5/1504; F02D 19/0626; F02D 1/16

USPC ........... 701/103–105, 114, 115; 123/406.11, 123/406.23, 406.47

See application file for complete search history.

(56) References Cited

U.S. PATENT DOCUMENTS

| | | | |
|---|---|---|---|
| 5,957,994 A | 9/1999 | Meyer et al. | |
| 6,388,444 B1* | 5/2002 | Hahn | G01M 15/11 123/406.24 |
| 7,163,002 B1 | 1/2007 | Halverson et al. | |
| 2007/0277787 A1 | 12/2007 | Husak et al. | |
| 2012/0138017 A1* | 6/2012 | Jentz | F02D 41/0025 123/436 |
| 2013/0184969 A1* | 7/2013 | Rollinger | F02D 41/22 701/103 |
| 2014/0069380 A1* | 3/2014 | Leone | F02M 26/01 123/406.12 |
| 2014/0261317 A1* | 9/2014 | Loucks | F02D 41/0087 123/350 |
| 2015/0059698 A1* | 3/2015 | Frampton | F02D 41/1458 123/434 |

* cited by examiner

*Primary Examiner* — John Kwon

(74) *Attorney, Agent, or Firm* — Julia Voutyras; McCoy Russell LLP

(57) ABSTRACT

Systems and methods for improving emissions of an internal combustion engine are presented. In one example, engine crankshaft acceleration is a basis for estimating engine air-fuel ratio during engine starting when output of an oxygen sensor may be unavailable. An actual engine air-fuel ratio may be adjusted in response to the estimated engine air-fuel ratio.

20 Claims, 5 Drawing Sheets

SYSTEMS AND METHODS FOR IMPROVING ENGINE EMISSIONS DURING STARTING

FIELD

The present description relates to systems and methods for improving engine emissions during engine starting when engine temperature is below desired engine operating temperature. The methods and system may be particularly useful for engines that operate lean of stoichiometric conditions during engine idle conditions immediately following engine starting.

BACKGROUND AND SUMMARY

An internal combustion spark ignition engine may be operated at an air-fuel ratio that is lean of a stoichiometric air fuel ratio shortly after an engine is started and engine temperature is near ambient temperature. By operating the engine lean, hydrocarbon emissions from the engine may be reduced at a time when efficiency of a catalyst coupled to the engine is low so that vehicle emissions may be reduced. Further, since engine temperature is near ambient temperature, engine NOx emissions may be low while the engine operates with a lean air-fuel mixture. However, if the engine's air-fuel ratio is leaner than desired, the engine may misfire and engine emissions may increase. Alternatively, if the engine's air-fuel ratio is lean, but richer than is desired, engine hydrocarbon emissions may increase.

One way to ensure that the engine is operating within a desired air-fuel range is to position an oxygen sensor in an exhaust system coupled to the engine and adjust the engine air-fuel ratio based on oxygen sensor output. However, accurate oxygen sensor output may not be available until the oxygen sensor reaches a threshold temperature. Engine air-fuel ratio may be open loop controlled (e.g., controlled without feedback) during cold engine starting, but the actual engine air-fuel ratio may deviate from the desired engine air-fuel ratio due to fuel injector transfer function errors and other conditions. Variation in fuel system components may be compensated via fuel multipliers that are learned and adapted at warm engine operating conditions. Nevertheless, an engine's air-fuel ratio may deviate from a desired engine air-fuel ratio when an engine is at or near ambient temperature is started due to fuel puddling and temperature dependent fuel component variation. Therefore, it may be desirable to provide a way to control engine air-fuel ratio during conditions when oxygen sensor feedback is not available.

The inventors herein have recognized the above-mentioned disadvantages and have developed an engine operating method, comprising: receiving sensor data to a controller; and adjusting an engine air-fuel ratio in response to a difference between a desired standard deviation of engine crankshaft acceleration and a determined standard deviation of engine crankshaft acceleration via the controller, the desired standard deviation of engine crankshaft acceleration based on a desired engine air-fuel ratio, the determined standard deviation of engine crankshaft acceleration based on the sensor data.

By adjusting engine air-fuel ratio in response to a difference between a desired standard deviation of engine crankshaft acceleration and a determined standard deviation of engine crankshaft acceleration, it may be possible to provide the technical result of improving engine emissions during times when oxygen sensor feedback is not available. In one example, the desired standard deviation of engine crankshaft acceleration may be based on a desired engine air-fuel ratio so that when the engine is operated at the desired standard deviation of engine crankshaft acceleration the engine operates at the desired air-fuel ratio. If the determined standard deviation of engine acceleration is less than or greater than desired, it may be judged that the engine is not operating at the desired air-fuel ratio. As a result, the engine air-fuel ratio may be adjusted. In this way, the engine may be operated at the desired air-fuel ratio without oxygen sensor feedback.

The present description may provide several advantages. In particular, the approach may reduce engine emissions during engine starting. Further, the approach provides for air-fuel ratio feedback when oxygen sensors may not be available to improve engine operation. Further still, the approach may make it possible to operate an engine with a smaller catalyst while meeting emissions requirements.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
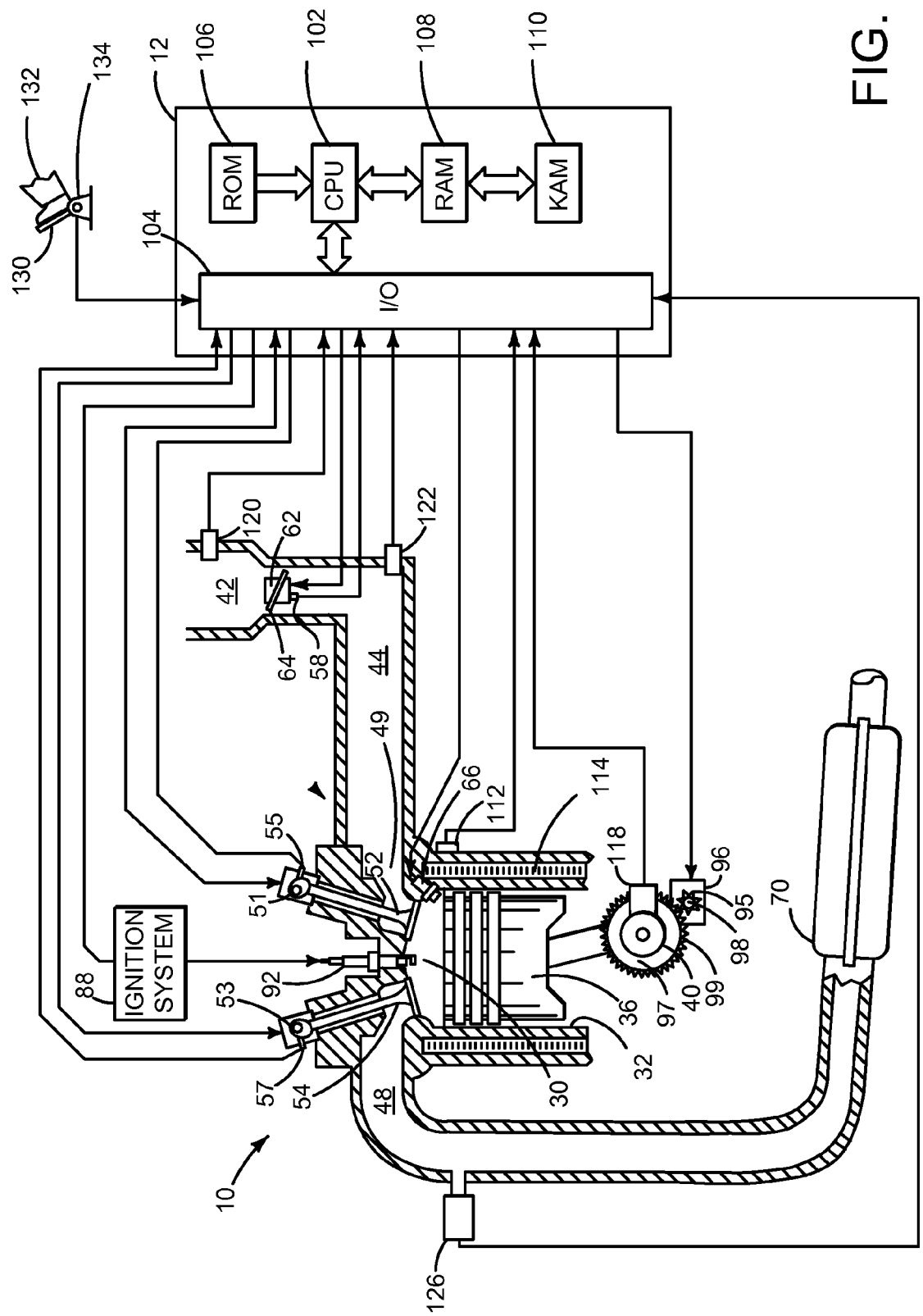
FIG. 1 is a schematic diagram of an engine.
Figure 2:
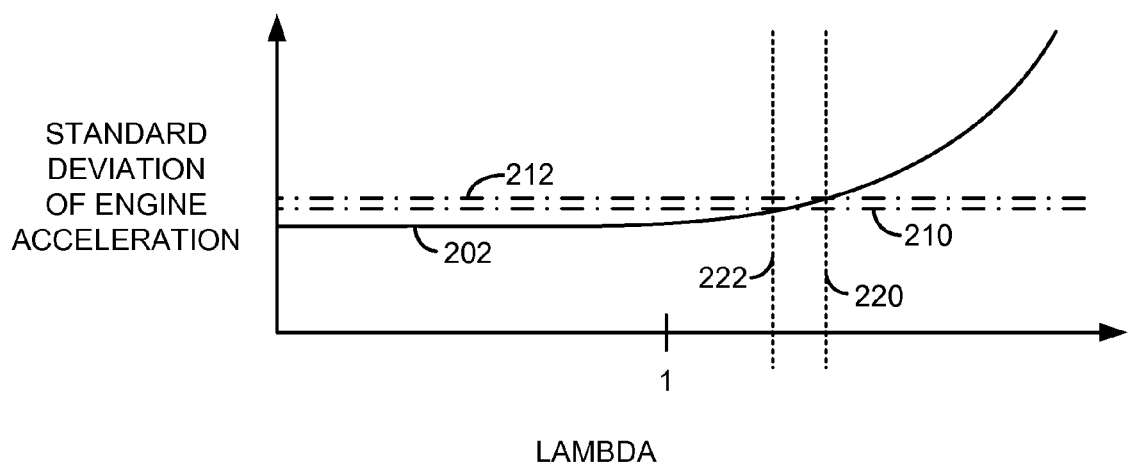
FIG. 2 is shows a plot illustrating a relationship between engine acceleration and engine air-fuel ratio.

The present description is related to operating a vehicle that includes an internal combustion engine. The engine may be configured as shown in FIG. 1. The engine air-fuel ratio may be estimated based on relationships between engine acceleration and engine air-fuel ratio as is shown in FIGS. 2-3B. The engine may be operated according to the method of FIG. 5 to provide the engine operating sequence shown in FIG. 4. The method described in FIG. 5 provides for estimating engine air-fuel ratio based on engine operating conditions, not including oxygen sensor feedback, and adjusting an engine air-fuel based on the estimated engine air-fuel ratio.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Liquid fuel injector 66 is shown positioned to inject fuel directly into cylinder 30, which is known to those skilled in the art as direct injection. Alternatively, liquid fuel may be injected to an intake port, which is known to those skilled in the art as port injection. Fuel injector 66 delivers liquid fuel in proportion to pulse widths from controller 12. Fuel is delivered to fuel injector 66 by a fuel system (not shown) including a fuel tank, fuel pump, and fuel rail (not shown).

Intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

A driver 132 inputs a driver demand torque to controller 12 via accelerator pedal 130 and accelerator pedal position sensor 134. The driver demand torque may be a function of vehicle speed and accelerator pedal position.

Controller 12 is shown in FIG. 1 as a conventional microcomputer including: microprocessor unit 102, input/output ports 104, non-transient memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. Engine acceleration may be determined by evaluating engine speed at two different engine positions and dividing a difference in engine speed at the two engine positions by a time that it takes the engine to rotate from the first engine position to the second engine position.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the method of FIG. 1 provide for an engine system, comprising: an engine including a crankshaft position sensor; a controller including executable instructions stored in non-transitory memory to adjust an air-fuel ratio of the engine in response to a standard deviation of engine crankshaft acceleration error, the standard deviation of engine crankshaft acceleration error based on a desired engine air-fuel ratio and a determined standard deviation of engine crankshaft acceleration based on output of the crankshaft position sensor.

In some examples, the engine system further comprises additional instructions to adjust the air-fuel ratio via a fuel injector. The engine system further comprises additional instructions to determine engine crankshaft acceleration from the output of the crankshaft position sensor. The engine system further comprises additional instructions to filter the engine crankshaft acceleration. The engine system further comprises additional instructions to determine an absolute value of the filtered engine crankshaft acceleration. The engine system further comprises additional instructions to filter the absolute value of the filtered engine crankshaft acceleration. The engine system further comprises instructions to store engine fuel adjustments based on the difference between a desired standard deviation of engine crankshaft acceleration and the determined standard deviation of engine crankshaft acceleration to memory.

Referring now to FIG. 2, a plot showing a relationship between standard deviation of engine crankshaft acceleration and engine air-fuel ratio is shown. The relationship shown in FIG. 2 is representative for an engine operating at a substantially constant engine speed (e.g., varying by less than ±100 RPM) with constant spark timing and constant air flow through the engine. The horizontal axis represents engine lambda (e.g., engine air-fuel ratio divided by a stoichiometric air-fuel ratio for the fuel being combusted by the engine). Lambda increases from the left side of the plot to the right side of the plot. The vertical axis represents standard deviation of engine acceleration. Standard deviation (e.g., a measure of variance) of engine acceleration increases in the direction of the vertical axis arrow.

Curve 202 represents a relationship between standard deviation of engine acceleration and engine lambda for an engine that is operating at a substantially constant speed and spark timing. For each Lambda value along curve 202, there is a single corresponding value of standard deviation of engine acceleration. Vertical line 222 represents a lower Lambda value threshold for operating an engine at cold start (e.g., when engine temperature is substantially at ambient temperature (within ±3.5° C.)). Vertical line 220 represents an upper Lambda value threshold for operating the engine at cold start. The engine is desired to operate at a Lambda value between 222 and 220.

Horizontal line 210 is drawn from the intersection of curve 202 and line 222 over to the vertical axis to determine a standard deviation of engine acceleration that corresponds to the lower Lambda value. Horizontal line 212 is drawn from the intersection of curve 202 and line 220 over to the vertical axis to determine the standard deviation of engine acceleration that corresponds to the upper Lambda value. The engine may be operated at a standard deviation of engine acceleration value between 210 and 212 to operate the engine between the lower Lambda limit 222 and the upper Lambda limit 220. In this way, a desired engine Lambda value for operating the engine at when the engine is cold started and oxygen sensors are unavailable may be the basis for operating the engine at a standard deviation of engine crankshaft acceleration where the engine operates with the desired engine Lambda value.

Figure 3A:
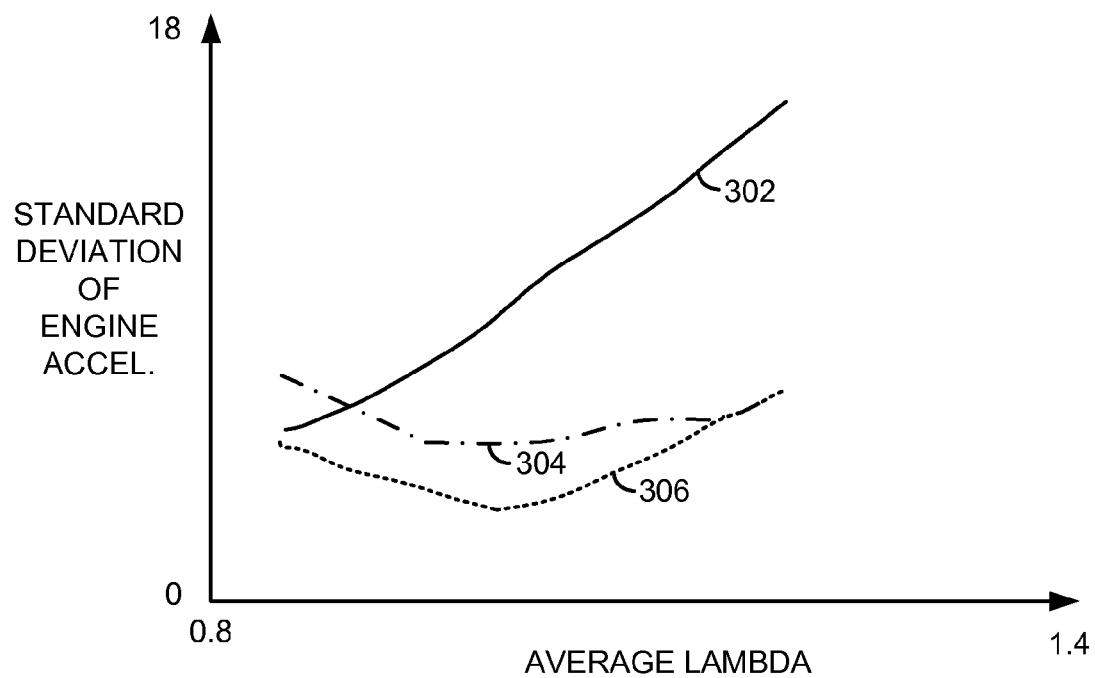
FIGS. 3A and 3B show plots of engine acceleration versus engine air-fuel ratio for different spark timings.
Figure 3B:
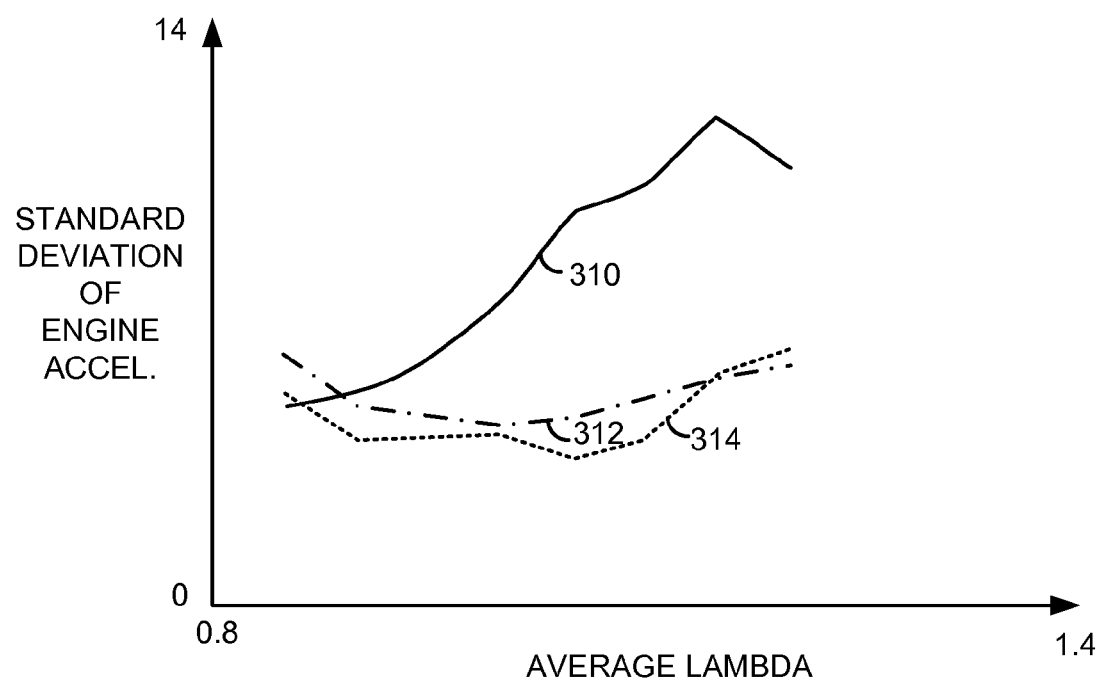

Referring now to FIG. 3A, a plot of standard deviation of engine acceleration versus average Lambda an engine is shown. The vertical axis represents standard deviation of engine acceleration. The horizontal axis represents a Lambda value at which an engine is operating. The engine that produced the data shown was operated at a spark timing of zero degrees or with spark that occurred at top-dead-center compression stroke during the engine cycle.

Curve 302 represents standard deviation of engine acceleration versus average Lambda for when the engine operates at 1400 RPM. Curve 304 represents standard deviation of engine acceleration versus Lambda for when the engine operates at 1300 RPM. Curve 306 represents standard deviation of engine acceleration versus average Lambda for when the engine operates at 700 RPM. The engine air flow is different for each curve so the engine may operate at zero degrees spark timing. Additional curves may be provided for operating the engine at speeds between 700 RPM and 1400 RPM.

Thus, it may be observed that the engine provides a unique curve at each engine speed. A standard deviation of engine acceleration may be determined for operating the engine at a desired Lambda value by indexing data shown in the plot that corresponds to the engine speed at which the engine is operating. For example, if the engine is idling at 1300 RPM and TDC spark timing, desired Lambda is the basis for indexing the plot and retrieving a value of standard deviation of engine acceleration based on data of curve 304.

Referring now to FIG. 3B, a second plot of standard deviation of engine acceleration versus average Lambda an engine is shown. The vertical axis represents standard deviation of engine acceleration. The horizontal axis represents a Lambda value at which an engine is operating. The engine that produced the data shown was operated at a spark timing of minus ten degrees or with spark that occurred ten degrees advanced of top-dead-center compression stroke during the engine cycle.

Curve 310 represents standard deviation of engine acceleration versus average Lambda for when the engine operates at 1400 RPM. Curve 312 represents standard deviation of engine acceleration versus Lambda for when the engine operates at 1300 RPM. Curve 314 represents standard deviation of engine acceleration versus average Lambda for when the engine operates at 700 RPM. The engine air flow is different for each curve so the engine may operate at minus ten degrees spark timing. Additional curves may be provided for operating the engine at speeds between 700 RPM and 1400 RPM.

Thus, it may be observed that the engine provides a unique curve at each engine speed. Further, the curves of FIG. 3B are different than the curves for FIG. 3A. Similar to the procedure described for FIG. 3A, a standard deviation of engine acceleration may be determined for operating the engine at a desired Lambda value by indexing data shown in the plot that corresponds to the engine speed at which the engine is operating. For example, if the engine is idling at 1300 RPM minus ten degrees spark timing, desired Lambda is the basis for indexing the plot and retrieving a value of standard deviation of engine acceleration based on data of curve 312.

A plurality of data maps similar to the data maps of FIGS. 3A and 3B may be provided in controller memory for a range of spark timings (e.g., TDC, 0, −5, −10, −20, etc.) so that a standard deviation of engine speed may be determined for a desired engine Lambda value or range even though the engine may be operated at different spark timings based on engine operation conditions such as engine temperature. By indexing the appropriate data map, a standard deviation of engine speed may be retrieved from memory as a basis for operating the engine as described in further detail with regard to FIG. 5.

Figure 4:
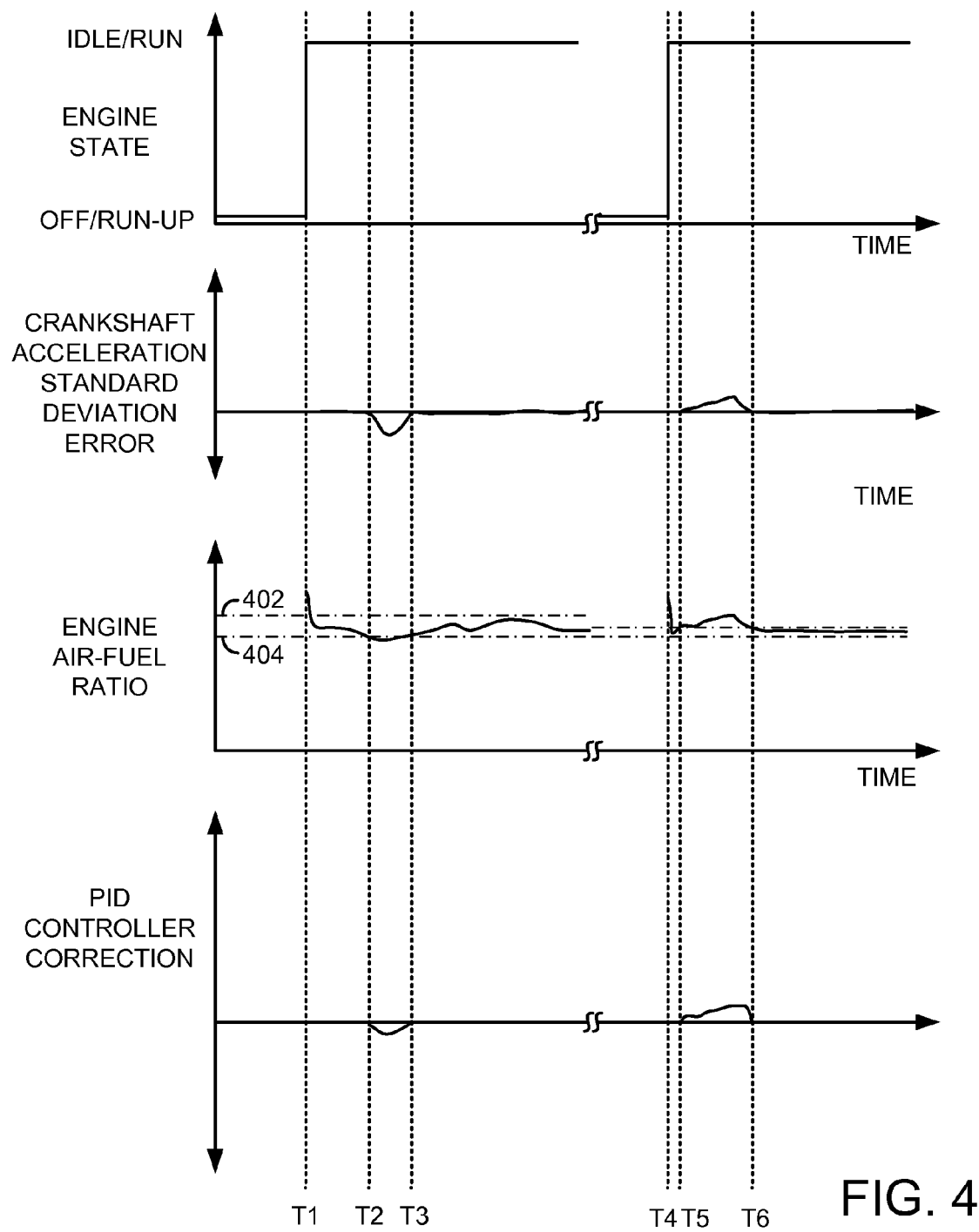
FIG. 4 shows an example vehicle operating sequence.
Figure 5:
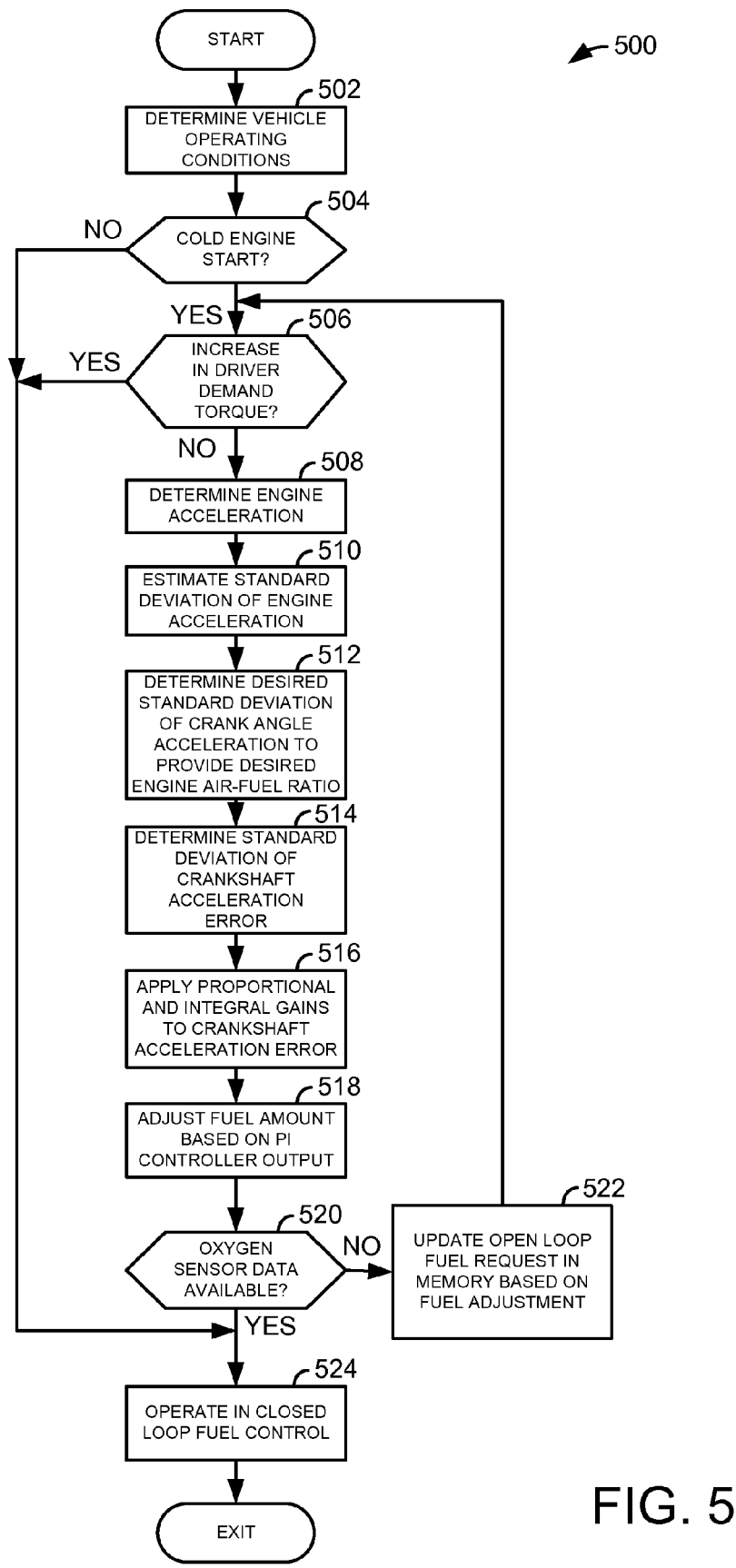
FIG. 5 shows an example method for operating an engine.

Referring now to FIG. 4, a simulated example vehicle operating sequence for the system of FIG. 1 is shown. The operating sequence may be provided via executable instructions that provide the method of FIG. 5 in cooperation with sensors and actuators shown in FIG. 1. Vertical lines T1-T6 indicate times of interest during the sequence. The SS disruptions along each of the horizontal axes represent brakes in time in the sequence. The brake in time may be a long or short duration. The plots of FIG. 4 are time aligned.

The first plot from the top of FIG. 4 is a plot of engine operating state versus time. The vertical axis represents engine operating state. The engine is in run mode or idling when the corresponding trace is at a higher level near the vertical axis arrow. The engine is not rotating (e.g., stopped or off) or at run-up speed (e.g., a speed less than idle speed) when the corresponding trace is at a lower level near the horizontal axis. The horizontal axis represents time and time increases from the left side of the plot to the right side of the plot.

The second plot from the top of FIG. 4 is a plot of selected standard deviation of engine acceleration error versus time. Standard deviation of engine acceleration error is desired standard deviation of engine acceleration minus actual or measured standard deviation of engine acceleration. The vertical axis represents standard deviation of engine acceleration error. The horizontal axis represents time and time increases from the left side of the plot to the right side of the plot.

The third plot from the top of FIG. 4 is a plot of engine air-fuel ratio versus time. The vertical axis represents engine air-fuel ratio and the engine air-fuel ratio grows leaner in the direction of the vertical axis arrow. The horizontal axis represents time and time increases from the left side of the plot to the right side of the plot. Line 402 represents an upper engine air-fuel ratio threshold above which the engine is not desired to operate. Line 404 represents a lower engine air-fuel ratio threshold below which the engine is not desired to operate. Thus, it is desired for the engine to operate between threshold 402 and threshold 404.

The fourth plot from the top of FIG. 4 is a plot of proportional/integral/derivative (PID) controller fuel amount correction versus time. The vertical axis represents PID controller fuel amount correction. The engine fuel amount is increased when the PID controller fuel amount correction value is above the horizontal axis. The engine fuel amount is decreased when the PID controller fuel amount correction value is below the horizontal axis. The engine fuel amount is not corrected when the PID controller fuel amount correction value is at the horizontal axis. The horizontal axis represents time and time increases from the left side of the plot to the right side of the plot.

At time T0, the engine is stopped and the standard deviation error of engine crankshaft acceleration error is zero. The engine air-fuel ratio is off scale to indicate air is sensed in the engine's exhaust system. The PID controller output is zero and accurate engine oxygen sensor data is not available (not shown). At a time just before time T1 the engine is started.

At time T1, the engine speed reaches a threshold speed so that the engine state transitions to run mode. The standard deviation error of crankshaft acceleration error is zero and the engine air-fuel ratio is lean, but getting richer. The PID controller output is zero and accurate engine oxygen sensor data is not available (not shown).

Between time T1 and time T2, the engine remains in run mode. The standard deviation of engine acceleration error is zero and the engine air-fuel ratio is trending richer. The PID controller output is zero because the engine air-fuel ratio is between threshold 402 and threshold 404.

At time T2, the engine continues in run mode and the engine air-fuel ratio is richer than threshold 404. The standard deviation of engine acceleration error increases in a negative direction (e.g., magnitude increases) in response to the estimated engine air-fuel ratio based on engine acceleration. The PID controller correction term also increases in a negative direction (e.g., magnitude increases) in response to the increasing standard deviation of engine acceleration error. Accurate engine oxygen sensor data is not available (not shown).

Between time T2 and time T3, PID controller correction term decreases an amount of fuel injected to the engine, thereby driving the engine air-fuel leaner. The engine remains in run mode and standard deviation of engine acceleration error increases and then decreases in the negative direction. Accurate engine oxygen sensor data is not available (not shown).

At time T3, engine air-fuel ratio returns to be between thresholds 402 and 404. The standard deviation of engine acceleration error returns to zero in response to engine air-fuel ratio returning between thresholds 402 and 404. The PID controller correction term returns to a value of zero and the engine remains in run mode. Accurate engine oxygen sensor data is not available (not shown).

After time T3 and before time T4, the engine remains in run mode and the engine air-fuel ratio remains between thresholds 402 and 404. The standard deviation of engine acceleration error is zero and the PID controller correction is also zero. Accurate engine oxygen sensor data is not available (not shown).

Between time T3 and time T4, a time brake occurs. The engine cools to ambient temperature during the time brake.

At time T4, the engine speed reaches a threshold speed so that the engine state transitions to run mode. The standard deviation error of crankshaft acceleration error is zero and the engine air-fuel ratio is lean, but getting richer. The PID controller output is zero and accurate engine oxygen sensor data is not available (not shown).

At time T5, the engine continues in run mode and the engine air-fuel ratio is leaner than threshold 402. The standard deviation of engine acceleration error increases in a positive direction (e.g., magnitude increases) in response to the estimated engine air-fuel ratio based on engine acceleration. The PID controller correction term also increases in a positive direction (e.g., magnitude increases) in response to the increasing standard deviation of engine acceleration error. Accurate engine oxygen sensor data is not available (not shown).

Between time T5 and time T6, PID controller correction term increases an amount of fuel injected to the engine, thereby driving the engine air-fuel richer. The engine remains in run mode and standard deviation of engine acceleration error increases and then decreases in the positive direction. Accurate engine oxygen sensor data is not available (not shown).

At time T6, engine air-fuel ratio returns to be between thresholds 402 and 404. The standard deviation of engine acceleration error returns to zero in response to engine air-fuel ratio returning between thresholds 402 and 404. The PID controller correction term returns to a value of zero and the engine remains in run mode. Accurate engine oxygen sensor data is not available (not shown).

In this way, engine air-fuel ratio may be adjusted responsive to standard deviation of engine acceleration error. The engine air-fuel ratio is controlled to be within upper and lower Lambda threshold values to improve engine emissions.

Referring now to FIG. 5, a method for operating an engine is shown. The method of FIG. 5 may be at least partially implemented as executable instructions stored in controller memory. The method of FIG. 4 may cooperate with and be a part of the system of FIGS. 1 and 2 to adjust states of devices in the physical world. Further, the method of FIG. 5 along with the system of FIGS. 1 and 2 may provide the operating sequence shown in FIG. 4.

At 502, method 400 determines vehicle operating conditions. Vehicle operating conditions may be determined via data input to a controller from vehicle sensors and actuators. Vehicle operating conditions may include but are not limited to engine speed, time since engine stop, engine load, engine coolant temperature, and engine spark timing. Method 500 proceeds to 504 after vehicle operating conditions are determined.

At 504, method 500 judges if the engine is at cold start conditions. In one example, method 500 judges if an engine is being cold started based on engine speed being less than a threshold speed, engine temperature, and time since engine stop less than a threshold amount of time. If method judge that the engine is at cold start conditions, the answer is yes and method 500 proceeds to 506. Otherwise, the answer is no and method 500 proceeds to 524.

At 506, method 500 judges if there has been an increase in driver demand torque since engine stop. An increase in driver demand torque may be determined based on output of an accelerator pedal position sensor being greater than a threshold value. If method 500 judges that there is an increase in driver demand torque, the answer is yes and method 500 proceeds to 524. Otherwise, the answer is no and method 500 proceeds to 508.

At 508, method 500 determines engine acceleration. In one example, engine acceleration is determined by evaluating engine speed at two different engine positions and dividing a difference in engine speed at the two engine positions by a time that it takes the engine to rotate from the first engine position to the second engine position. For example, if engine speed is determined at a first time T100 to be 500 RPM, and if engine speed is determined at a second time T101 to be at 525 RPM, engine acceleration is determined to be (525−500)/0.1 seconds=250 RPM/second when it takes 0.1 seconds for the engine to rotate between the two times. Method 500 proceeds to 510 after engine acceleration is determined.

At 510, method 500 determines standard deviation of engine crankshaft acceleration. Method 500 inputs engine crankshaft acceleration values taken over time into a first order low pass filter. The first order low pass filter time constant is adjusted to provide an engine crankshaft acceleration mean estimate. The engine crankshaft acceleration mean estimate is subtracted from each estimate of engine crankshaft acceleration to provide a first result. An absolute value is taken or performed on the first result to provide a second result. Finally, the second result is passed through a second first order low pass filter to provide the determined standard deviation of engine acceleration for each estimate of engine acceleration. Thus, squaring operations and a buffer of engine crankshaft acceleration values are not used in the method of the present invention to determine standard deviation. As a result, controller computational load may be reduced. Method 500 proceeds to 512 after standard deviation of engine acceleration is determined.

Thus, the well-known standard deviation formula described by:

$$\sigma = \sqrt{\frac{1}{N}\sum_{i=1}^{N}(x_i - \bar{x})^2}$$

where σ is the standard deviation, N is the number of data points, x is the variable, and $\bar{x}$ is the variable mean is replaced by a unique approximation comprising two first order low pass filters and an absolute value operation. Consequently, controller computational load may be reduced.

At 512, method 500 determines a desired standard deviation of engine acceleration to provide a desired engine air-fuel ratio. In one example, a desired engine air-fuel ratio is stored in controller memory. The desired engine air-fuel ratio is empirically determined and stored in memory. The desired engine air-fuel ratio is stored in a table or function that is indexed based on engine temperature and number of combustion events since engine stop. For example, the desired engine air-fuel ratio may be a value of 1.03 Lambda for a predetermined number of combustion events since engine stop.

Once the desired engine air-fuel ratio is determined, it is used to index one or more tables or functions that provide a relationship between standard deviation of engine acceleration and engine air-fuel ratio (e.g., as shown in the curves of FIGS. 2-3B). The table or function outputs desired standard deviation of engine crankshaft acceleration for the desired engine air-fuel ratio. Further, curves shown in FIGS. 2-3B may be the output of one or more additional tables or functions. In one example, output of three two dimensional tables provides the curves shown in FIGS. 2-3B. The tables include a first table or function that outputs an adjustment to the desired standard deviation of engine acceleration based on engine speed and engine load (e.g., engine air charge divided by theoretical engine air charge). A second table or function outputs an adjustment to desired standard deviation of engine crankshaft acceleration based on time since engine stop and engine temperature. Further, a third table or function outputs an adjustment to desired standard deviation of engine crankshaft acceleration based on engine speed and engine spark timing. Method 500 proceeds to 514 after a desired standard deviation of engine crankshaft acceleration is determined.

At 514, method 500 determines standard deviation of engine acceleration error. The standard deviation of engine acceleration error is desired standard deviation of engine crankshaft acceleration determined at 512 minus determined standard deviation of engine acceleration from 510.

Alternatively, method 500 may make the standard deviation of engine crankshaft acceleration error zero for standard deviation of engine crankshaft acceleration errors less than an upper standard deviation of engine crankshaft acceleration error threshold and greater than a lower standard deviation of engine crankshaft acceleration error threshold. The upper standard deviation of engine crankshaft acceleration error threshold corresponding to an upper engine air-fuel ratio, and the lower standard deviation of engine crankshaft acceleration error threshold corresponding to a lower engine air-fuel ratio threshold as illustrated in FIG. 4. Standard deviation of engine crankshaft acceleration errors outside of the upper and lower thresholds are maintained at their present values. In this way, an engine air-fuel ratio dead-band may be provided. Method 500 proceeds to 516 after standard deviation of engine acceleration error is determined.

At 516, method 500 applies a proportional/integral/derivative controller to the standard deviation of engine acceleration error determined at 514. The PID controller output may be expressed as:

$$u(t) = K_p e(t) + K_i \int e(t)dt + K_d \frac{de}{dt}$$

where u(t) is the PID controller output, $K_p$ is the proportional gain, $K_i$ is the integral gain, $K_d$ is the derivative gain, e is the standard deviation of engine acceleration error, and t is time. The proportional, integral, and derivative gains may be empirically determined and stored in memory. Method 500 proceeds to 518 after PID controller output is determined.

At 518, method 500 adjusts fuel injector timing based on PID controller output. In one example, PID controller output is added to an engine fuel injection amount and fuel injector timing is adjusted based on the adjusted fuel injection amount. For example, the PID output may request that X grams of additional fuel be delivered to each engine cylinder. The present cylinder fuel amount is increased by X grams of fuel. By increasing or decreasing the amount of fuel supplied to engine cylinders, the standard deviation of engine acceleration may be adjusted so that the engine operates with the desired engine air-fuel ratio. Thus, the engine air-fuel ratio is closed-loop adjusted responsive to standard deviation of engine acceleration. Method 500 proceeds to 520 after the air-fuel ratios of the engine cylinders are adjusted.

At 520, method 500 judges whether or not engine oxygen sensor data is available. Oxygen sensor data may not be accurate for a time after engine start because it takes time for the oxygen sensor to warm to an operating temperature. The amount of time to warm the oxygen sensor may vary based on ambient temperature and engine exhaust gas temperature. In one example, method 500 judges if oxygen sensor data is available based on a time since electrical power was provided to the oxygen sensor. If method 500 judges that oxygen sensor data is available, the answer is yes and method 500 proceeds to 524. Otherwise, the answer is no and method 500 proceeds to 522. Thus, method 500 operates without oxygen sensor feedback until the oxygen sensor is available.

At 522, method 500 updates values of desired engine air-fuel ratio in memory based on the number of engine combustion events since engine stop and the adjustments the PID controller applies to the fuel injectors. In one example, if the PID controller increases the engine fuel amount at a particular combustion event, the engine air-fuel ratio for that particular combustion event is incremented by a predetermined amount. Method 500 returns to 506 after desired engine air-fuel ratio values are updated in memory.

At 524, method 500 transitions to closed-loop engine air-fuel control where the engine air-fuel ratio is adjusted based on oxygen sensor feedback as is known in the art. Method 500 proceeds to exit after the engine enters closed-loop oxygen sensor feedback control of the engine air-fuel ratio.

Thus, the method of FIG. 5 provides for an engine operating method, comprising: receiving sensor data to a controller; and adjusting an engine air-fuel ratio in response to a difference between a desired standard deviation of engine crankshaft acceleration and determined standard deviation of engine crankshaft acceleration via the controller, the desired standard deviation of engine crankshaft acceleration based on a desired engine air-fuel ratio, the determined standard deviation of engine crankshaft acceleration based on the sensor data. The method includes where the desired engine crankshaft acceleration is further estimated based on engine load, and where the desired engine air-fuel ratio is adjusted to be within an upper threshold engine air-fuel ratio and a lower threshold engine air-fuel ratio.

In some examples, the method includes where the desired engine crankshaft acceleration is further estimated based on engine speed. The method includes where the desired engine crankshaft acceleration is further estimated based on spark timing. The method includes where the desired engine crankshaft acceleration is further estimated based on time since engine stop. The method includes where the desired engine crankshaft acceleration is further estimated based on engine coolant temperature. The method includes where the engine air-fuel ratio is adjusted via adjusting opening timing of a fuel injector.

The method of FIG. 5 also provides for an engine operating method, comprising: receiving sensor data to a controller; and adjusting an engine air-fuel ratio in response to a difference between a desired standard deviation of engine crankshaft acceleration and a determined standard deviation of engine crankshaft acceleration via the controller, the desired standard deviation of engine crankshaft acceleration based on a desired engine air-fuel ratio, the determined standard deviation of engine crankshaft acceleration based on the sensor data, the determined standard deviation of engine crankshaft acceleration approximated via two low pass filters. The method includes where the determined standard deviation of engine crankshaft acceleration is approximated via applying an absolute value to output of one of the two low pass filters.

In some examples, the method includes where the engine air-fuel ratio is adjusted via adjusting fuel injection timing. The method further comprises inputting the determined standard deviation of engine crankshaft acceleration into a proportional/integral/derivative controller and adjusting the engine air-fuel ratio in response to output of the proportional/integral/derivative controller. The method includes where the determined standard deviation of engine crankshaft acceleration is based on an engine position sensor. The method further comprises storing engine fuel adjustments based on the difference between the desired standard deviation of engine crankshaft acceleration and the determined standard deviation of engine crankshaft acceleration to memory.

As will be appreciated by one of ordinary skill in the art, method described in FIG. 5 may represent one or more of any number of processing strategies such as event-driven, interrupt-driven, multi-tasking, multi-threading, and the like. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
   receiving sensor data to a controller; and
   adjusting an engine air-fuel ratio in response to a magnitude of a difference between a desired standard deviation of engine crankshaft acceleration and a determined standard deviation of engine crankshaft acceleration via the controller, the desired standard deviation of engine crankshaft acceleration based on a desired engine air-fuel ratio, the determined standard deviation of engine crankshaft acceleration based on the sensor data.

2. The method of claim 1, where desired engine crankshaft acceleration is further estimated based on engine load, and where the desired engine air-fuel ratio is adjusted to be within an upper threshold engine air-fuel ratio and a lower threshold engine air-fuel ratio.

3. The method of claim 2, where desired engine crankshaft acceleration is further estimated based on engine speed.

4. The method of claim 3, where desired engine crankshaft acceleration is further estimated based on spark timing.

5. The method of claim 4, where desired engine crankshaft acceleration is further estimated based on time since engine stop.

6. The method of claim 5, where desired engine crankshaft acceleration is further estimated based on engine coolant temperature.

7. The method of claim 1, where the engine air-fuel ratio is adjusted via adjusting opening timing of a fuel injector.

8. An engine operating method, comprising:
receiving sensor data to a controller; and
during an engine cold start where exhaust gas oxygen sensor data is unavailable, closed-loop adjusting an engine air-fuel ratio in response to a magnitude of a difference between a desired standard deviation of engine crankshaft acceleration and a determined standard deviation of engine crankshaft acceleration via the controller, the desired standard deviation of engine crankshaft acceleration based on a desired engine air-fuel ratio, the determined standard deviation of engine crankshaft acceleration based on the sensor data, the determined standard deviation of engine crankshaft acceleration approximated via two low pass filters.

9. The method of claim 8, where the determined standard deviation of engine crankshaft acceleration is approximated via applying an absolute value to output of one of the two low pass filters.

10. The method of claim 8, where the engine air-fuel ratio is adjusted via adjusting fuel injection timing.

11. The method of claim 8, further comprising inputting the determined standard deviation of engine crankshaft acceleration into a proportional/integral/derivative controller and adjusting the engine air-fuel ratio in response to output of the proportional/integral/derivative controller.

12. The method of claim 8, where the determined standard deviation of engine crankshaft acceleration is based on an engine position sensor.

13. The method of claim 8, further comprising storing engine fuel adjustments based on the difference between the desired standard deviation of engine crankshaft acceleration and the determined standard deviation of engine crankshaft acceleration to memory.

14. An engine system, comprising:
an engine including a crankshaft position sensor;
an exhaust gas oxygen sensor coupled in an exhaust of the engine; and
a controller including executable instructions stored in non-transitory memory to adjust an air-fuel ratio of the engine in response to a magnitude of a standard deviation of engine crankshaft acceleration error during engine starting while output of the exhaust gas oxygen sensor is unavailable, the standard deviation of engine crankshaft acceleration error based on a desired engine air-fuel ratio and a determined standard deviation of engine crankshaft acceleration based on output of the crankshaft position sensor.

15. The engine system of claim 14, further comprising additional instructions to adjust the air-fuel ratio via a fuel injector.

16. The engine system of claim 15, further comprising additional instructions to determine engine crankshaft acceleration from the output of the crankshaft position sensor.

17. The engine system of claim 16, further comprising additional instructions to filter the engine crankshaft acceleration.

18. The engine system of claim 17, further comprising additional instructions to determine an absolute value of the filtered engine crankshaft acceleration.

19. The engine system of claim 18, further comprising additional instructions to filter the absolute value of the filtered engine crankshaft acceleration.

20. The engine system of claim 14, further comprising instructions to store engine fuel adjustments based on the difference between a desired standard deviation of engine crankshaft acceleration and the determined standard deviation of engine crankshaft acceleration to memory.

* * * * *